(12) United States Patent
Lindblom

(10) Patent No.: US 9,790,026 B2
(45) Date of Patent: Oct. 17, 2017

(54) EMERGENCY STOP DEVICE

(71) Applicant: Texo Application AB, Älmhult (SE)

(72) Inventor: Bo Lindblom, Osby (SE)

(73) Assignee: TEXO APPLICATION AB, Älmhurt (SE)

( * ) Notice: Subject to any disclaimer, the term of this patent is extended or adjusted under 35 U.S.C. 154(b) by 0 days.

(21) Appl. No.: 15/101,487

(22) PCT Filed: Nov. 28, 2014

(86) PCT No.: PCT/SE2014/051421
§ 371 (c)(1),
(2) Date: Jun. 3, 2016

(87) PCT Pub. No.: WO2015/084236
PCT Pub. Date: Jun. 11, 2015

(65) Prior Publication Data
US 2016/0304279 A1    Oct. 20, 2016

(30) Foreign Application Priority Data
Dec. 3, 2013 (SE) ....................... 1351439

(51) Int. Cl.
*B61H 7/00* (2006.01)
*B65G 1/04* (2006.01)
*B65G 1/06* (2006.01)

(52) U.S. Cl.
CPC ......... *B65G 1/0492* (2013.01); *B65G 1/0414* (2013.01); *B65G 1/065* (2013.01); *B65G 2207/40* (2013.01)

(58) Field of Classification Search
CPC .. B65G 1/0492; B65G 1/065; B65G 2207/40; B65G 1/0414; F16D 63/00; B61H 7/12; B61H 7/02; B61K 7/62
(Continued)

(56) References Cited

U.S. PATENT DOCUMENTS 3,817,406 A   6/1974 Maruoka et al.
3,880,299 A   4/1975 Zollinger et al.
(Continued)

FOREIGN PATENT DOCUMENTS

WO    2012/138538    10/2012

OTHER PUBLICATIONS

International Search Report and Written Opinion dated Mar. 11, 2015 for corresponding application No. PCT/SE2014/051421.

*Primary Examiner* — Pamela Rodriguez
(74) *Attorney, Agent, or Firm* — Renner, Otto, Boisselle & Sklar, LLP

(57) ABSTRACT

An emergency stop device for a shuttle moveable in a horizontal plane on two elongated rails arranged in parallel includes at least one pressure biased locking shoulder displaceable in a horizontal plane, and at least one stabilizing wheel arranged together with the locking shoulder in a holder and protruding outside the locking shoulder, wherein the stabilizing wheel is rotatable in a horizontal plane. The locking shoulder and the stabilizing wheel together have an extension such that they together can be received, at least partially in a hole provided in a substantially vertical web of the rails at an end portion of the rail, when biased by the pressure bias. A frictional coupling is arranged between the shuttle and holder and allows limited movement of the shuttle in the horizontal plane after the locking shoulder has reached a locked position vis-à-vis the rails. Further, a stockroom system includes a plurality of pairs of parallel, elongated rails, arranged in a horizontal plane, and a shuttle movable on a pair of rails, and along the rails, wherein each rail is designed with a substantially vertical web and at least one protruding horizontal portion for bearing of load, the at least one protruding horizontal portion protruding from the (Continued)

substantially vertical web, wherein the stockroom system comprises an emergency stop device according to the above.

7 Claims, 5 Drawing Sheets

(58) Field of Classification Search
USPC ......... 188/41–44, 62, 107, 28, 30, 31, 70 R, 188/70 B, 72.3, 170; 104/249, 250, 257, 104/258, 252, 253; 267/162, 164; 187/359
See application file for complete search history.

(56) References Cited

U.S. PATENT DOCUMENTS

| | | | |
|---|---|---|---|
| 3,973,685 A | 8/1976 | Loomer | |
| 5,927,444 A * | 7/1999 | Checketts | B61H 7/12 188/107 |
| 6,155,176 A * | 12/2000 | Checketts | A63G 25/00 104/124 |
| 6,371,261 B1 * | 4/2002 | Thompson | B66B 5/22 187/370 |
| 7,140,302 B2 * | 11/2006 | Kickbush | B61K 7/08 104/250 |
| 7,975,811 B2 * | 7/2011 | Berliant | B61H 7/12 188/41 |
| 8,662,264 B2 * | 3/2014 | Legeret | B66B 5/18 187/375 |
| 9,068,609 B2 * | 6/2015 | Hortig | B65G 1/0492 |
| 2011/0008138 A1 * | 1/2011 | Yamashita | B65G 1/0492 414/277 |

* cited by examiner

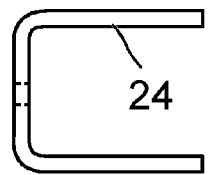
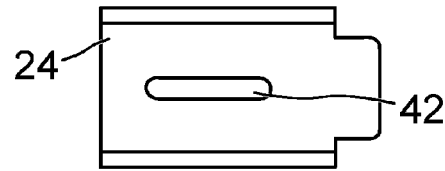
Fig. 5  Fig. 6
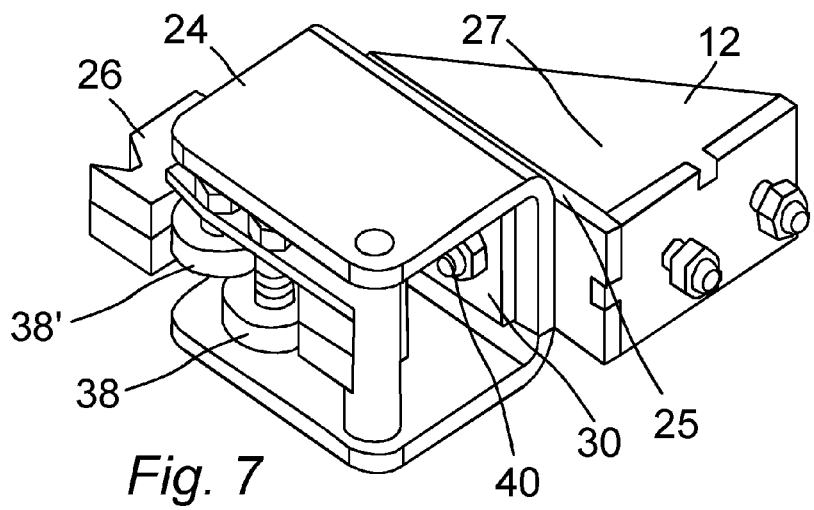
Fig. 7
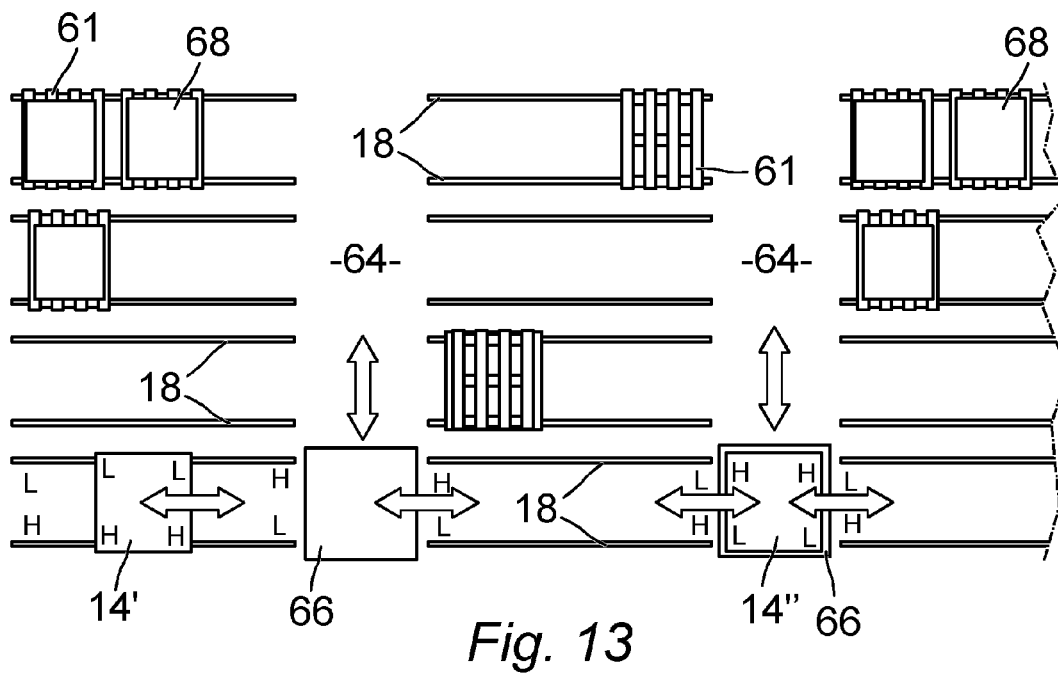
Fig. 13

EMERGENCY STOP DEVICE

This application is a national phase of International Application No. PCT/SE2014/051421 filed Nov. 28, 2014 and published in the English language.

FIELD OF INVENTION

The invention relates to an emergency stop device for a shuttle movable on two elongated rails, arranged in parallel in a horizontal plane, and to a storage system having a plurality of pairs of elongated rails, arranged in parallel in a horizontal plane, and a shuttle movable on a pair of rails and along the rails.

STATE OF THE ART

Stockroom systems for rack storage with large height and similar types of storages comprise a large number of beams and rails upon which goods, preferably in the form of pallets, may be stored. Usually, a number of stories are provided and elevators and/or cranes are used to transport the goods vertically and horizontally. Also present may be carriages that move in aisles between pairs of rails. Within automated stockroom systems, shuttles are provided which autonomously travel on a pair of rails and can fetch or leave goods on the rails. The shuttles may be transported with the aid of cranes, elevators or carriages.

The shuttles are controlled by a control system, and a number of sensors sense the positions and movements of the shuttles. At standard operational conditions the shuttles are prevented from moving outside a predefined range of motion with a margin to the end of the rails. The shuttles themselves are heavy and are able to transport loads of hundreds of kilograms, in certain context tons, and it is therefore important, with the aid of some kind of emergency stop device, to secure that they do not run the risk of passing beyond the end of the rails.

There are shuttles with emergency stop devices having catches directed downwards, which cooperates with dollies provided on the rails. This type of emergency stop devices entails a heightening of each plane of rails, which in turn implies lower density and capacity of the stockroom system. Additionally an emergency stop would then cause great loads on rails and other parts of the stockroom system, because the movement of the shuttle is so abruptly brought to a stop.

SUMMARY

Thus, an object of the invention is to provide an emergency stop device, which overcomes the problems and drawbacks mentioned above. In accordance with the invention, the emergency stop device is arranged not to occupy any storage space. Additionally, in an emergency situation, there is a controlled deceleration of the shuttle.

In some embodiments of the invention, the emergency stop device includes a locking shoulder arranged displaceable in a holder, said locking shoulder being biased in a direction away from the shuttle towards an elongated rail supporting the shuttle. The holder also supports at least one wheel, which during standard operational conditions is biased to abut a vertical web of the rail. In both ends of the rail there are holes provided in the web. The dimensions of the hole are such that both the wheel and the locking shoulder may fall into it, in case the shuttle would move all the way out to the end of the rail. The locking shoulder is designed with an outwardly opening-notch, which occupy a portion of the web of the rail, when the locking shoulder falls into the hole of the rail. When the web of the rail has reached the bottom of the notch, the motion of the holder will cease.

The holder supporting the locking shoulder and the wheels is via a frictional coupling connected to a console, fixedly arranged in the shuttle. In some embodiments the frictional coupling comprises a locking plate pressed against a surface of the holder, and fastened with the aid of at least one bolt. The bolt can run in a slit made in the holder, when the shuttle together with the console is displaced in relationship to the holder in connection with the deceleration of the shuttle at an emergency stop. The friction between the locking plate and the surface of the holder is in such a case set by allowing the bolt fastening the locking plate to be tightened with a predetermined torque. Also frictional properties of the locking plate and holder influence the braking. By selecting suitable material or surface coating of contacting surfaces of locking plate and holder, a desired deceleration can be achieved.

In case an emergency situation occurs, and the emergency stop device is triggered, it is important that the results of the emergency stop are investigated. Even if deceleration is effected in a controlled way with the aid of the invention, damages or wear may arise on the shuttle or the rails or other parts of the storage system. The locking plate also must be restored to allow a new emergency stop to occur. For this reason, a sensor may be arranged to indicate movement of the holder relative the console. The sensor is preferably connected to a superior computer system, which also controls the shuttles. It is also possible to mark the original position of the console in relation to the holder using paint, adhesive tape or the like, such that an ocular inspection distinctly indicates that an emergency stop has occurred.

The rapid deceleration of the shuttle increases the risk that the cargo resting on the shuttle will slip, and in worst case causes damages on the stockroom system or on surrounding installation. To lessen the problem of slipping cargo, a catch may be arranged on holder or console. The catch comprises a pointed wedge that is rotated such that a point penetrates the cargo, preferably a pallet of wood, when the console moves in relation to the by the locking shoulder stopped holder in an emergency stop situation. Also at standard loads, a pallet may slip 170 mm or more, which may entail great hazards. At large loads, more than twice as big slips may occur.

BRIEF DESCRIPTION OF THE DRAWINGS

In order to explain the function and advantages of the invention, different embodiments of the invention are shown on the appended drawings. It should be noted that the embodiments shown on the figures are only examples, and that other embodiments are possible within the scope of the invention. In the figures FIG. 5 shows a schematic lateral view of a holder forming part of an embodiment of an emergency stop device in accordance with the invention, FIG. 6 shows a schematic front view of the holder of FIG. 5, FIG. 7 shows a schematic view in perspective of the in FIG. 2 shown embodiment of the emergency stop device in accordance with the invention, FIG. 13 shows schematically a stockroom system, in which the emergency stop device in accordance with the invention is used.

THE INVENTION

Figure 1:
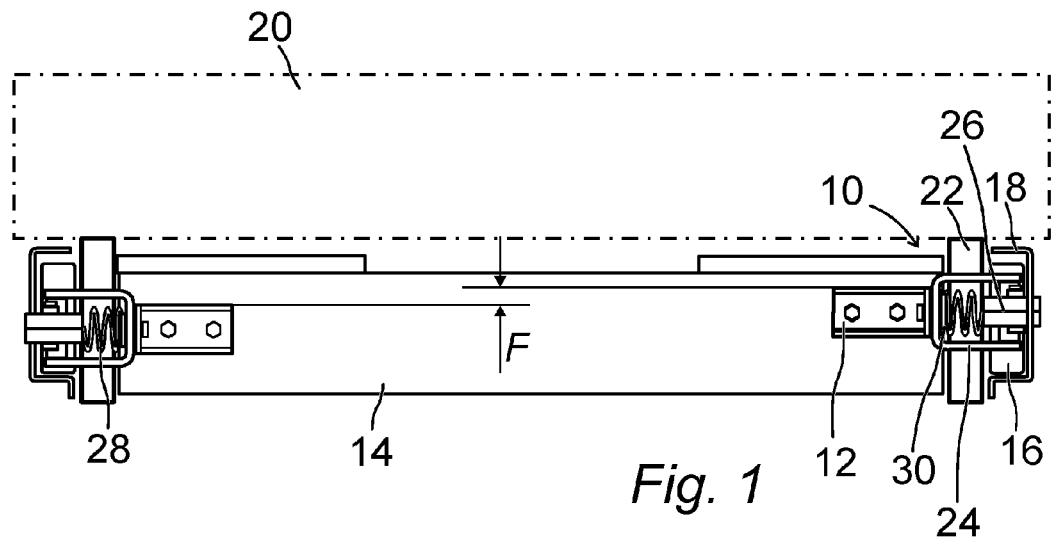
FIG. 1 shows a schematic lateral view of a shuttle with an embodiment of an emergency stop device in accordance with the invention on each side.

The embodiment of an emergency stop device 10 in accordance with the invention shown in FIG. 1 is attached to a shuttle 14 with the aid of a console 12. The shuttle runs with wheels 16 on two elongated and in parallel arranged rails 18. Cargo 20 is schematically implied in the form of a pallet on top of the shuttle. In the embodiment shown in FIG. 1 the cargo is resting on two rubber bands 22 when the shuttle is moving. The rubber bands 22 can be controlled such that the cargo is placed on a desired place on the rails 18. The console 12 is via a frictional coupling connected to a holder 24, which carries a locking shoulder 26. In the embodiment shown, the locking shoulder is biased by a spring in a direction out towards the rail 18, and the frictional coupling comprises a locking plate 30. Also other means may be used to bring about the desired bias load. The consoles 12 are arranged at different heights on the shuttle, as is indicated at symbol F. This difference in height makes it possible for the shuttle 14 to move in and out from certain pair of rails 18, while the emergency stop is activated at other rails, see also FIG. 13 and the corresponding description below.

Figure 2:
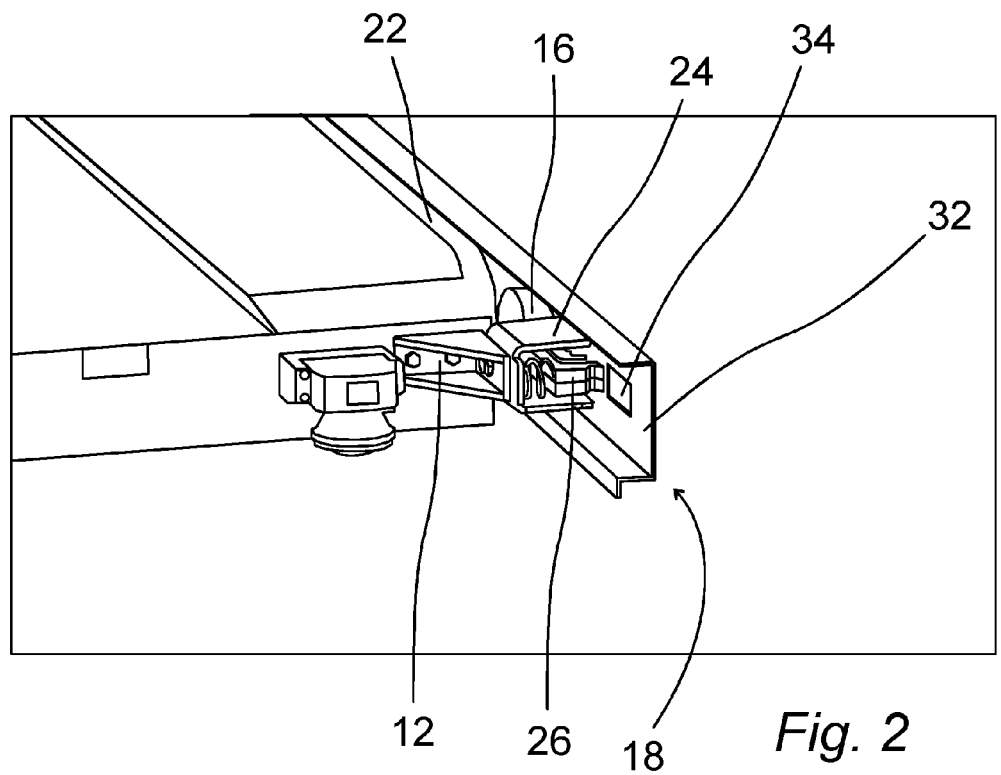
FIG. 2 shows a schematic view in perspective of a part of a shuttle with an embodiment in accordance with the invention on one side, and with an inside of a rail visible.

FIG. 2 shows the console 12, the holder 24, the locking shoulder 26, the rubber bands 22 and the wheel 16. The rail 18 is made with a vertical web 32, when seen in profile. In the web a hole 34 is made.

Figure 3:
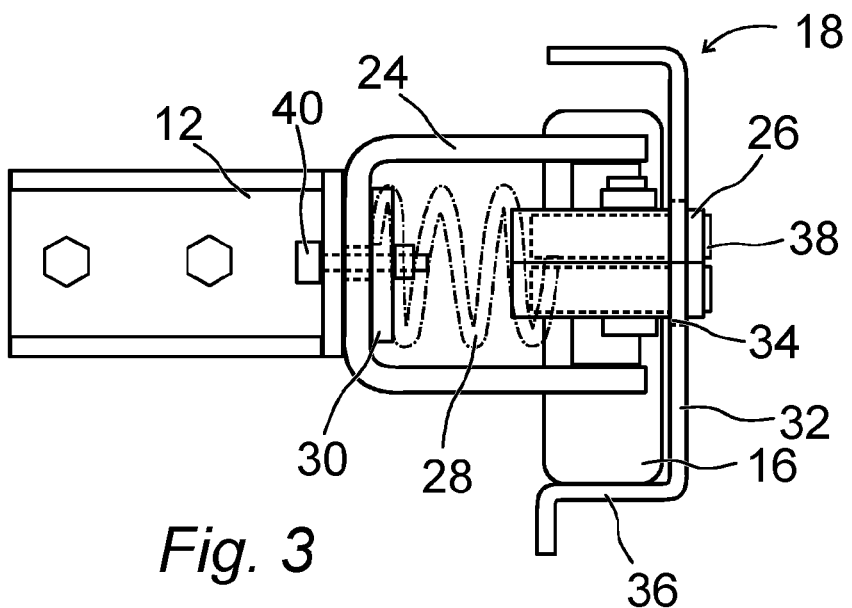
FIG. 3 shows a schematic lateral view of an embodiment of an emergency stop device in accordance with the invention.

FIG. 3 shows how the wheel rests on a portion 36 of the rail 18 extending perpendicular to the web 32. The locking shoulder 26 extends out through the hole 34 in the web 32. In the embodiment shown in FIG. 3 the holder 24 carries, in addition to the locking shoulder 26, also two stabilizing wheels 38. The stabilizing wheels 38 normally run on an inside of the web 32 of the rail 18, but in the shown position have been forced into the hole 34 together with the locking shoulder 26. It should be noted that the stabilizing wheels 38 extends further out than does the locking shoulder 26. In this position also the locking plate 30 has slid in relation to the holder 24 under friction against an inside of the holder 24.

The locking plate is clamped against the inside of the holder with the aid of two retaining screws 40 arranged in the console, only one of which shown in this view. The retaining screws 40 have been tightened with a predetermined torque in order to achieve a desired friction between the inside of the holder and the locking plate.

Figure 4:
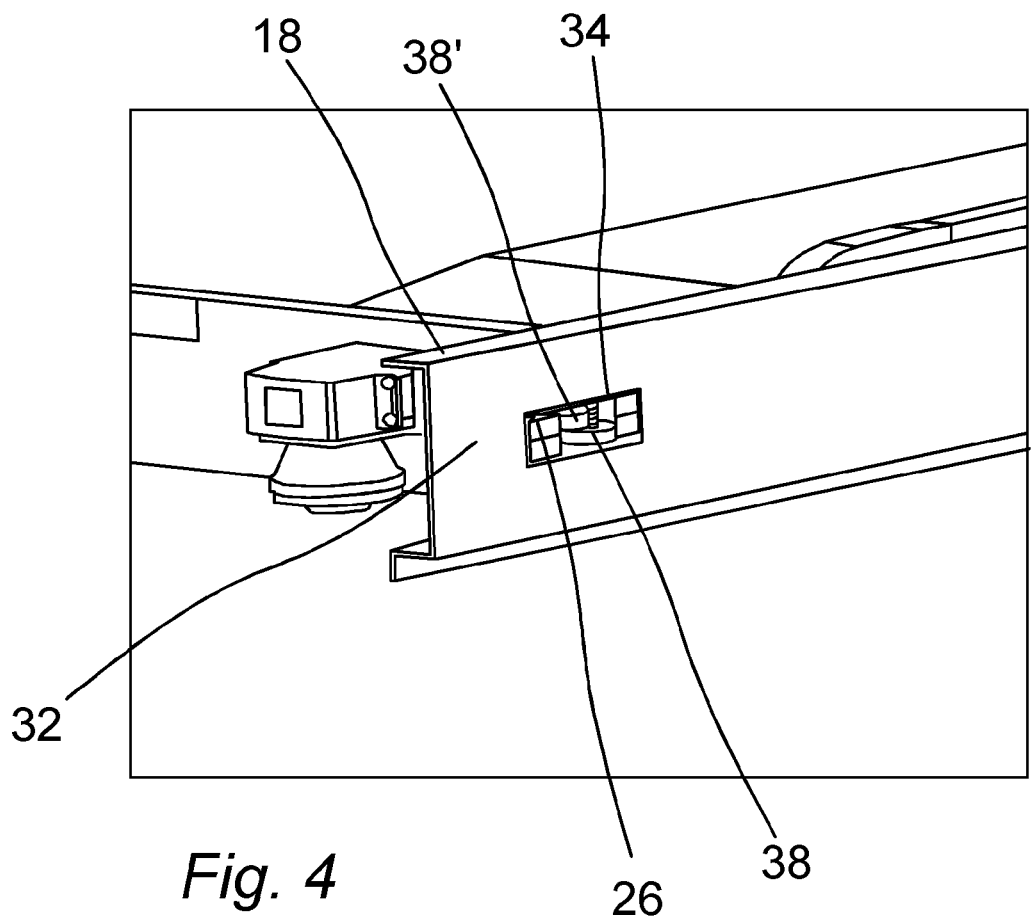
FIG. 4 shows a schematic view in perspective of the embodiment of the emergency stop device in accordance with the invention shown in FIG. 2, with an outside of the rail visible.

FIG. 4 shows schematically how the locking shoulder 26 and the stabilizing wheels 38 have been forced out through the hole 34 in the rail 18. In this position the holder is completely prevented from moving further towards the end of the rail. On the opposite side of the rail 18, the hole is made at a lower height in the web 32. This means that an upper stabilizing wheel 38' will bear against the inside of the web 32 and keep the locking shoulder 26 outside the hole. As a result the whole shuttle will be able to pass by the hole in the opposite end of the rail. See also FIG. 13 and the accompanying description below.

FIG. 5 and FIG. 6 show the holder 24 without locking shoulder and wheels. The holder 24 is made with a slot 42, through which the retaining screws 40 (see FIG. 3) are inserted in order to clamp the locking plate.

It is clear from the embodiment of FIG. 7 that the stabilizing wheels 38 and 38' are arranged at different heights. The reason for this is that a stabilizing wheel 38 in that way can bear against the web 32 of a rail 18, also when the stabilizing wheels 38 and the locking shoulder 26 pass a hole 34 in a rail 18, see also the description above, referring to FIG. 4 and below referring to FIG. 13. The locking shoulder 26 and the stabilizing wheels 38 and 38' are carried by the holder 24. The locking plate 30 is clamped against a surface of the holder with the aid of retaining screws 40, which rests with their heads against an inside of the console 12.

The holder 24 is shown in an initial position, which is evident from the fact that a marking 25 is made in the console 12. If the emergency stop device was to be activated, the console would slide to the left in the figure in relation to the holder 24, and the marking 25 would indicate this. The emergency stop device in accordance with the invention may also be provided with a sensor 27, which is connected to a control unit of the shuttle and the stockroom system. The sensor 27 is arranged to directly sense if a movement occurs between the holder 24 and the console 12, and in that case to emit an alarm signal.

Figure 8:
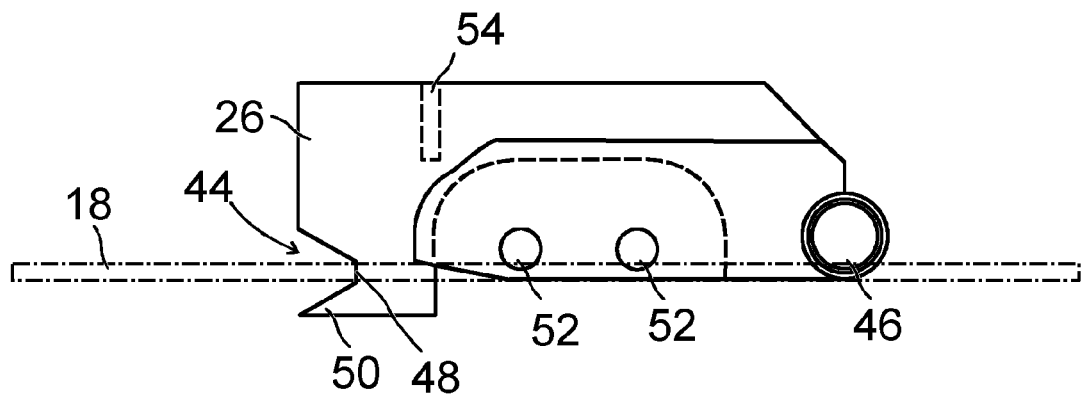
FIG. 8 shows a schematic top view of an embodiment of an emergency stop device in accordance with the invention including a locking shoulder.

In the embodiment of the locking shoulder 26 shown in FIG. 8, there is made an outwardly widening V-shaped notch 44 in one end of the locking shoulder 26. An opposite end of the locking shoulder comprises a fulcrum 46, which constitutes axis of rotation of the entire locking shoulder. A hinge axis 47 is attached to the holder 24. The notch 44 has a floor 48, the width of which corresponds to or slightly exceeds the thickness of the web 32 of the rail 18. A defining side of the notch 44 in the locking shoulder 26 ends in a tip 50. The tip 50 falls at an emergency stop directly into the hole 34 of the rail 18 and secures that the locking shoulder rapidly slides into locking. In the locking shoulder 26 there is also made two hub bores 52, in which wheel axes for the stabilizing wheels 38, 38' are housed. An attachment hole 54 is made close to the end facing away from the fulcrum of the locking shoulder 26. In the attachment hole 54, there is attached the spring 28 which biases the entire locking shoulder in a direction out towards the rail 18.

Figure 9:
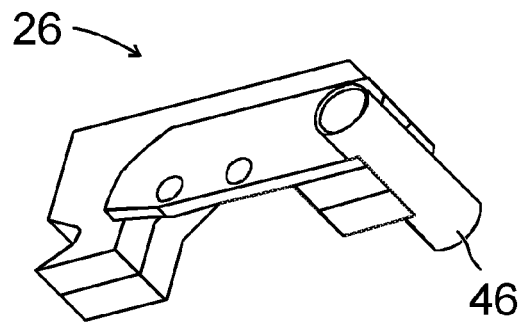
FIG. 9 shows a schematic view in perspective of the locking shoulder of FIG. 8.

The perspective view of FIG. 9 shows that the locking shoulder 26 has a relatively large thickness, which is appropriate to handle those forces arising during an emergency stop, without causing the locking shoulder to break.

Figure 10:
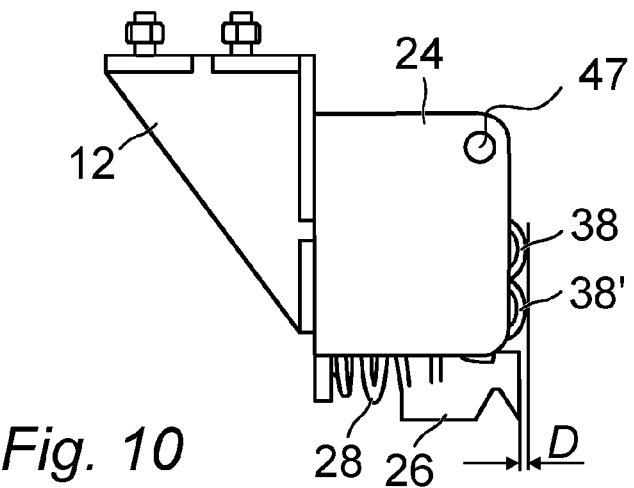
FIG. 10 shows a schematic top view of an embodiment of an emergency stop device in accordance with the invention.

FIG. 10 shows that the stabilizing wheels 38, 38' protrude a distance D outside the tip of the locking shoulder 26. In this way it is secured that the locking shoulder does not bear against the inside of the rail 18 during standard operational conditions, but instead that one or both of the stabilizing wheels 38, 38' position the entire locking shoulder. The holder 24 is biased to bear directly against the console 12, even during sliding of the holder 24 at an emergency stop.

Figure 11:
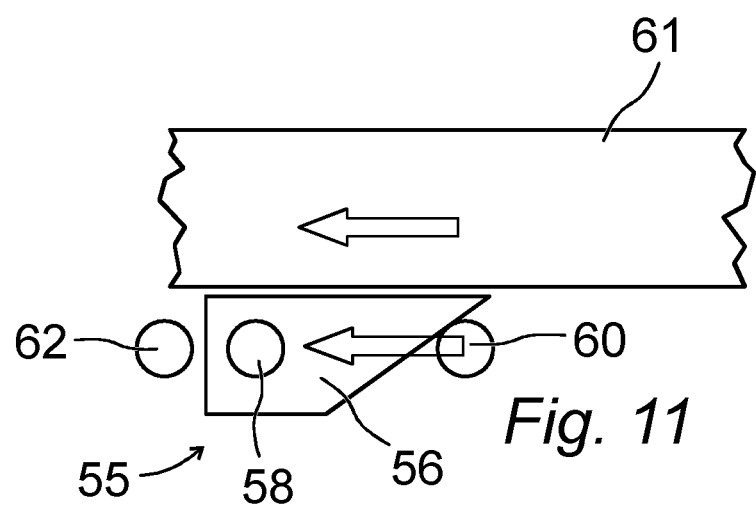
FIG. 11 shows schematically the function of a catch on the point of braking a cargo, being part of an embodiment of an emergency stop device in accordance with the invention.
Figure 12:
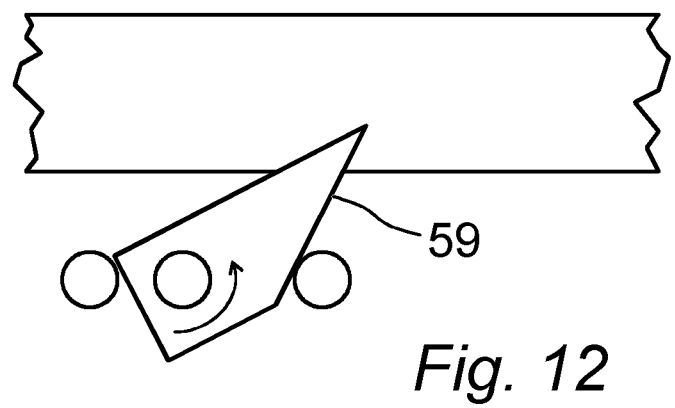
FIG. 12 shows schematically the function of the catch of FIG. 11 after emergency stop braking of the shuttle.

FIG. 11 and FIG. 12 shows schematically in what way a supplementary stop device may be designed. A locking wedge 56 is pivotably arranged around a horizontal axis 58. An oblique surface 59 of the locking wedge 56 rests against a pin 60 movable in a horizontal plane. The stop device 55 is arranged such that the pin 60 is displaced forwardly when the shuttle with the console 12 is decelerated by the locking plate. At the movement of the pin 60 forwardly, the oblique surface will slide against the pin 60 and be forced upwards by rotating around the horizontal axis 58, such that a tip of the locking wedge 56 will be pressed into a pallet 61 or the like placed on the shuttle. In that way, it is avoided that the pallet slips off the shuttle at the rapid deceleration caused by the emergency stop device. The turning of the locking wedge is limited by a stopper 62.

FIG. 13 shows schematically a part of a stockroom system with a plurality of pairs of rails 18 with intervening aisles 64. In the aisles 64 cranes 66 are arranged, movable orthogonally to the extension of the rails 18. One crane serves a plurality of pairs of rails 18. A shuttle 14 can be transported on a crane supported on rails similar to the rails 18. From the crane 66 a shuttle 14 can move in on a pair of rails 18, preferably in two opposite directions from the aisle 64. In FIG. 13, a shuttle 14' down left has moved to the left into a pair of rails 18, while a shuttle 14" down right still remains standing on a crane. Pallets 61, with or without cargo in the form of boxes 68, are placed on different pairs of rails 18.

In FIG. 13, the height position of the holes 34 of the bottom row of rails 18 are marked with the letters L and H respectively, for low and high, respectively. Corresponding markings have been made for the position of the locking shoulders 26 and the position of the stabilizing wheel 38 on the shuttles 14', 14". This design makes it possible for the shuttle 14' to leave its crane 66 and pass by the end of the rails 18, since the upper side of the shuttle shown in the figure is provided with low (L) placement of the locking shoulders 26 and the stabilizing wheels 38, while the holes in to the right in the rails 18 is arranged in a high (H) position. At the bottom of the shuttle and rail respectively, the inverted conditions apply.

This means that the stabilizing wheels 38, or at least one of them, will remain in contact with the web of the rail and not fall into the hole. In the left portion of the bottom row of rails the holes are provided in low position (L) in the upper rail, and in high position (H) in the lower rail. This means that the shuttle, if it was to move too far to the left, would reach a position where the upper locking shoulder (in position L) shown in the figure would fall into the hole of the rail, which also is in the low position (L). The reverse is true for the lower locking shoulders (in position H) of the shuttle in the figure, which will fall into the rail's hole (in high position H). As a result the emergency stop device will be put into operation and the shuttle will be decelerated.

The stabilizing wheels 38 and 38' are separated in a radial direction, c.f. also FIG. 10. This is advantageous in the situation where there is a gap between rails 18 and a crane 66. When a shuttle 14, 14', 14" moves between the crane and rails a first stabilizing wheel 38, 38' will always engage and remain in contact with the web of the rail and not fall into the gap. As a result the locking shoulder 26 is maintained in a non-locking position.

TABLE 1

| | | |
|---|---|---|
| Shuttle weight | 300 kg | |
| Load weight | 1200 kg | |
| Shuttle speed | 0.9 m/s | |
| Shuttle's braking distance | 0.03 m | |
| Operating friction coeff. cargo Shuttle | 0.3 | for wood to metal 0.2 to 0.5 |
| Resting friction coeff. Cargo Shuttle | 0.5 | for wood to metal from 0.5 to 0.65 |
| Movement of the load energy | 486 Nm | |
| Load friction force | 3531.6 N | |
| Shuttle's kinetic energy | 121.5 Nm | |
| Shuttle braking force | 4050 N | |
| This braking distance must Shuttle have for the load should not move | 0.81 m | |
| The load moves | 0.14 m | |
| Pallet rack is affected by | 7 582 N | |

The above table shows different data applying to a shuttle with cargo.

The invention claimed is:

1. Emergency stop device for a shuttle moveable in a horizontal plane on two elongated rails arranged in parallel, wherein at least one pressure biased locking shoulder is displaceable in a horizontal plane,
   at least one stabilizing wheel is arranged together with the locking shoulder in a holder and protruding outside the locking shoulder, wherein the stabilizing wheel is rotatable in a horizontal plane,
   the locking shoulder and the stabilizing wheel together have an extension such that they together can be received, at least partially, in a hole provided in a substantially vertical web of the rails at an end portion of the rails, when biased by the pressure bias, and
   a frictional coupling arranged between the shuttle and the holder allowing limited movement of the shuttle in the horizontal plane after the locking shoulder has reached a locked position vis-à-vis the rails.

2. The emergency stop device in accordance with claim 1, wherein the frictional coupling comprises a movable locking plate pressed towards a surface of the holder.

3. The emergency stop device in accordance with claim 2, wherein the locking plate is connected, non-displaceable, to a console attached to the shuttle.

4. The emergency stop device in accordance with claim 1, wherein the locking shoulder is designed with a V-shaped notch, opening outwardly, wherein a floor of the notch has a width corresponding to, or exceeding the thickness of the rails.

5. The emergency stop device in accordance with claim 1, wherein the locking shoulder is pressure biased with the aid of a helical spring attached to the holder.

6. The emergency stop device in accordance with claim 1, wherein two stabilizing wheels are arranged axially and radially displaced in the holder.

7. A stockroom system having a plurality of pairs of parallel, elongated rails, arranged in a horizontal plane and a shuttle movable on one pair of rails and along the rails, wherein each rail is designed with a substantially vertical web and at least one protruding horizontal portion for bearing of load, the at least one protruding horizontal portion protruding from the substantially vertical web, wherein
   at least one pressure biased locking shoulder is displaceable in a horizontal plane, at least one stabilizing wheel is arranged together with the locking shoulder in a holder and protruding outside the locking shoulder, wherein the stabilizing wheel is rotatable in a horizontal plane, the locking shoulder and the stabilizing wheel together have an extension allowing them to be least partially received in a hole arranged in the substantially vertical web of the rails in an end portion of the rails when biased by the pressure bias, and a frictional coupling arranged between the shuttle and the holder allowing limited movement of the shuttle in the horizontal plane after the locking shoulder has reached a locked position vis-à-vis the rails.

* * * * *